US007141537B2

(12) United States Patent
Audenaert et al.

(10) Patent No.: US 7,141,537 B2
(45) Date of Patent: Nov. 28, 2006

(54) MIXTURE OF FLUORINATED POLYETHERS AND USE THEREOF AS SURFACTANT

(75) Inventors: Frans A. Audenaert, Kaprijke (BE); Rudolf J. Dams, Antwerp (BE); Lian S. Tan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 49 days.

(21) Appl. No.: 10/696,950

(22) Filed: Oct. 30, 2003

(65) Prior Publication Data

US 2005/0096244 A1    May 5, 2005

(51) Int. Cl.
C11D 17/00 (2006.01)
(52) U.S. Cl. .................................. 510/356; 562/587
(58) Field of Classification Search ................ 510/356; 562/587
See application file for complete search history.

(56) References Cited

U.S. PATENT DOCUMENTS

| | | | |
|---|---|---|---|
| 2,567,011 A | 9/1951 | Diesslin et al. | |
| 3,250,808 A | 5/1966 | Moore, Jr. et al. | |
| 3,271,341 A | 9/1966 | Garrison, Jr. | |
| 3,274,244 A | 9/1966 | Mackenzie | |
| 3,472,894 A * | 10/1969 | Bartlett | 564/203 |
| 3,505,229 A | 4/1970 | Skehan | |
| 3,536,710 A | 10/1970 | Bartlett | |
| 3,555,089 A * | 1/1971 | Bartlrtt | 564/201 |
| 3,574,770 A | 4/1971 | Paine | |
| 3,621,059 A * | 11/1971 | Bartlett | 564/203 |
| 3,644,492 A | 2/1972 | Bartlett | |
| 3,646,085 A | 2/1972 | Bartlett | |
| 3,683,027 A | 8/1972 | Sainesi et al. | |
| 3,772,195 A | 11/1973 | Francen | |
| 3,787,351 A | 1/1974 | Olson | |
| 3,798,265 A * | 3/1974 | Bartlett | 562/567 |
| 3,810,874 A | 5/1974 | Mitsch | |
| 3,814,741 A | 6/1974 | Caporiccio et al. | |
| 3,839,425 A * | 10/1974 | Bartlett | 562/106 |
| 3,944,610 A | 3/1976 | Caporiccio et al. | |
| 3,950,588 A | 4/1976 | McDougal | |
| 4,090,967 A | 5/1978 | Falk | |
| 4,099,574 A | 7/1978 | Cooper et al. | |
| 4,242,516 A | 12/1980 | Mueller | |
| 4,359,096 A | 11/1982 | Berger | |
| 4,383,929 A | 5/1983 | Bertocchio et al. | |
| 4,472,286 A | 9/1984 | Falk | |
| 4,536,298 A | 8/1985 | Kamei et al. | |
| 4,647,413 A | 3/1987 | Savu | |
| 4,668,406 A | 5/1987 | Chang | |
| 4,795,764 A | 1/1989 | Alm et al. | |
| 4,923,720 A | 5/1990 | Lee et al. | |
| 4,975,502 A | 12/1990 | Morita et al. | |
| 4,983,769 A | 1/1991 | Bertocchio et al. | |
| 5,022,713 A | 6/1991 | Pugh et al. | |
| 5,027,742 A | 7/1991 | Lee et al. | |
| 5,066,522 A | 11/1991 | Cole et al. | |
| 5,085,786 A | 2/1992 | Alm et al. | |
| 5,108,799 A | 4/1992 | Hoy et al. | |
| 5,130,477 A | 7/1992 | Koike et al. | |
| 5,132,455 A | 7/1992 | Lagow | |
| 5,211,342 A | 5/1993 | Hoy et al. | |
| 5,274,159 A | 12/1993 | Pellerite et al. | |
| 5,294,248 A | 3/1994 | Chittofrati et al. | |
| 5,306,758 A | 4/1994 | Pellerite | |
| 5,352,752 A | 10/1994 | Koike et al. | |
| 5,424,438 A | 6/1995 | Chittofrati et al. | |
| 5,698,138 A | 12/1997 | Visca et al. | |
| 5,705,591 A | 1/1998 | Matsuda et al. | |
| 5,851,674 A | 12/1998 | Pellerite et al. | |
| 5,863,612 A | 1/1999 | DeSimone | |
| 5,910,557 A | 6/1999 | Audenaert et al. | |
| 5,922,833 A | 7/1999 | DeSimone | |
| 6,030,663 A | 2/2000 | McClain et al. | |
| 6,127,000 A | 10/2000 | Carbonell et al. | |
| 6,160,161 A | 12/2000 | Trabelsi et al. | |
| 6,200,884 B1 | 3/2001 | Yang et al. | |
| 6,218,499 B1 | 4/2001 | Tarumi et al. | |
| 6,287,640 B1 | 9/2001 | McClain et al. | |
| 6,288,157 B1 | 9/2001 | Jariwala et al. | |

(Continued)

FOREIGN PATENT DOCUMENTS

EP    0 250 767    9/1991

(Continued)

OTHER PUBLICATIONS

Milton J. Rosen, "Surfactants and Interfacial Phenomena," Second Ed., John Wiley & Sons, New York, NY, 1989, p. 1.

(Continued)

*Primary Examiner*—Thurman K. Page
*Assistant Examiner*—Chukwuma Nwaonicha

(57) ABSTRACT

The present invention provides the use of a fluorinated polyether composition as a surfactant, said fluorinated polyether composition comprising a mixture of fluorinated polyethers of the formula:

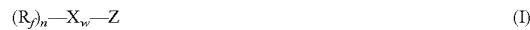

(R$_f$)$_n$—X$_w$—Z   (I)

wherein n is 1 or 2, w is 0 or 1, X is a divalent or trivalent organic linking group, Z is a polar group selected from the group consisting of an acid group or a salt thereof, an ammonium group, an amine-oxide group and an amphoteric group, and R$_f$ represents a perfluorinated polyether group of the formula:

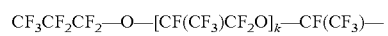

CF$_3$CF$_2$CF$_2$—O—[CF(CF$_3$)CF$_2$O]$_k$—CF(CF$_3$)— wherein k is at least 1;
said mixture of fluorinated polyethers having a weight average molecular weight between 750 g/mol and 5000 g/mol and the amount of perfluorinated polyether groups in said mixture where k is 2 or less, is not more than 10% by weight of the total amount of perfluorinated polyether groups in said mixture.

11 Claims, No Drawings

U.S. PATENT DOCUMENTS

| | | |
|---|---|---|
| 6,395,848 B1 | 5/2002 | Morgan et al. |
| 6,429,258 B1 | 8/2002 | Morgan et al. |
| 6,525,127 B1 | 2/2003 | Jariwala et al. |
| 6,592,659 B1 | 7/2003 | Terrazas et al. |
| 6,613,860 B1 | 9/2003 | Dams et al. |
| 2002/0192380 A1 | 12/2002 | Elsbernd et al. |
| 2003/0113555 A1 | 6/2003 | Pellerite et al. |
| 2003/0124361 A1 | 7/2003 | Moore et al. |
| 2003/0139521 A1 | 7/2003 | Linert et al. |
| 2003/0161962 A1 | 8/2003 | Lines et al. |
| 2003/0181572 A1 | 9/2003 | Tan et al. |

FOREIGN PATENT DOCUMENTS

| | | |
|---|---|---|
| EP | 0 219 065 | 3/1992 |
| EP | 0 273 449 | 3/1992 |
| EP | 0 615 779 | 2/1994 |
| EP | 0 625 526 | 11/1994 |
| EP | 0 770 634 | 5/1997 |
| EP | 0 789 050 | 8/1997 |
| EP | 0 797 111 | 9/1997 |
| EP | 0 870 778 | 10/1998 |
| EP | 1 006 168 | 6/2000 |
| EP | 1 038 919 | 9/2000 |
| EP | 0 853 638 | 4/2001 |
| EP | 1 329 548 | 7/2003 |
| JP | 57-70112 | 4/1982 |
| JP | 62-238867 | 10/1987 |
| JP | 4-146917 | 5/1992 |
| JP | 10-81873 | 3/1998 |
| WO | 97/44300 | 11/1997 |
| WO | WO 97/45167 | 12/1997 |
| WO | WO 98/40439 | 9/1998 |
| WO | WO 99/19080 | 4/1999 |
| WO | WO 99/37720 | 7/1999 |
| WO | WO 00/27544 | 5/2000 |
| WO | WO 00/56450 | 9/2000 |
| WO | WO 01/30873 | 5/2001 |
| WO | WO 01/94446 | 12/2001 |
| WO | WO 02/30848 | 4/2002 |
| WO | WO 02/95121 | 11/2002 |
| WO | WO 03/040209 A1 | 5/2003 |
| WO | 03/099904 | 12/2003 |

OTHER PUBLICATIONS

MIlton J. Rosen, "Surfactants and Interfacial Phenomena," Second Ed., John Wiley & Sons, New York, NY, 1989, pp. 3-4.

Fluorinated Surfactants and Repellents, Second Edition, by E. Kissa, Surfactant Science Series, vol. 97, Marcel Dekker, Inc.: New York, 2001, pp. 1-21.

Encyclopedia of Chemical Technology, 4$^{th}$ Edition, "Supercritical Fluids", N.Y., John Wiley and Sons, vol. 23, pp. 452-477.

K.A. Nielsen, J.N. Argyropoulos, D.C. Busby, D.J. Dickson, C.S. Lee, "Enhanced Performance and Improved Economics of Supercritical Fluid Applied Coatings", pp. 151-160, Feb. 22-24, 1995, Waterborne, High-Solids, and Powder Coatings Symposium.

W.C.Bunyard, F.E. Henon, S.N. Burns, R.W. Linton, R.G. Carbonell, J.M. DeSimone, "Synthesis of Novel Perfluoropolyethers for Carbon Dioxide-Based Coatings Technologies", University of North Carolina, Dept. of Chemistry, pp. 1-10.

J. Lewis, J.N. Argyropoulos, K.A. Nielson, "Supercritical Carbon Dioxide Spray Systems", Metal Fininshing, Apr. 1997.

Annual Book of ASTM Standards, 2003, ASTM D-1331, entitled Standard Test Methods for Surface and Interfacial Tension of Solutions of Surface-Active Agents, pp. 83-85.

Test method 22-1996, published in the 2001 Technical Manual of the American Association of Textile Chemists and Colorists (AATCC), entitled "Water Repellency: Spray Test", vol. 72, 1997, pp. 62-64.

American Association of Textile Chemists and Colorists (AATCC) Standard Test Method No. 118-1983, vol. 59, 1984, entitled "Oil Repellency: Hydrocarbon Resistance Test", p. 274.

Annual Book of ASTM Standards, Part 23, 1970, ASTM D 1141-52, entitled "Standard Specifications for Substitute Ocean Water", pp. 207-209.

U.S. Appl. No. 10/657,644, filed Sep. 8, 2003, Fluorinated Polyether Isocyanate Derived Silane Compositions.

\* cited by examiner

MIXTURE OF FLUORINATED POLYETHERS AND USE THEREOF AS SURFACTANT

FIELD OF THE INVENTION

The invention relates to the use of a particular fluorinated polyether composition as a surfactant. The invention also relates to a composition comprising an organic or aqueous liquid having dissolved or dispersed therein a mixture of fluorinated polyethers. The invention further relates to a mixture of fluorinated polyethers.

BACKGROUND

Fluorinated polyethers are well-known in the art and have found many applications. For example, fluorinated polyethers and their use have been described in U.S. Pat. Nos. 3,250,808, 3,839,425, and 5,130,477. The fluorinated polyethers have been used as intermediates in the preparation of useful compositions to be applied to substrates to impart oil and/or water repellent properties. The fluorinated polyethers have also been used as surfactants and emulsifying compounds. For example, fluoropolyether acids, amides and salts thereof have been described in U.S. Pat. Nos. 3,644,492, 3,798,265, 3,555,089, 3,621,059, 3,944,610, and 3,536,710.

There is however an ever growing environmental awareness and the fluorinated polyethers disclosed in the art, in particular those that have been disclosed for use as surfactants, may no longer meet today's expectations with respect to the environmental properties and impact of compositions based on such polyethers. It is a particularly desired environmental property that the fluorochemical surfactants are substantially free of fluorochemical components that eliminate slowly from the body of living organisms. Additionally, it is desired that the fluorochemical surfactants have a sufficient stability under normal conditions of use and storage such that they do not decompose into fluorochemical components that eliminate slowly from the body of living organisms. Of course in seeking more environmentally friendly compositions, other properties such as the performance as surfactants in a broad variety of applications should not be compromised or at least not to a substantial level and preferably the compositions can be conveniently manufactured at minimal costs.

SUMMARY OF THE INVENTION

The invention provides in one aspect the use of a fluorinated polyether composition as a surfactant, said fluorinated polyether composition comprising a mixture of fluorinated polyethers of the formula:

$$(R_f)_n\text{—}X_w\text{—}Z \tag{I}$$

wherein n is 1 or 2, w is 0 or 1, X is a divalent or trivalent organic linking group, Z is a polar group selected from the group consisting of an acid group or a salt thereof, an ammonium group, an amine-oxide group and an amphoteric group, and $R_f$ represents a perfluorinated polyether group of the formula:

$$CF_3CF_2CF_2\text{—}O\text{—}[CF(CF_3)CF_2O]_k\text{—}CF(CF_3)\text{—}$$

wherein k is at least 1;

said mixture of fluorinated polyethers having a weight average molecular weight between 750 g/mol and 5000 g/mol and the amount of perfluorinated polyether groups in said mixture where k is 2 or less, is not more than 10% by weight of the total amount of perfluorinated polyether groups in said mixture.

By the term surfactant is meant "a substance that, when present at low concentration in a system, has the property of adsorbing onto the surfaces or interfaces of the system and of altering to a marked degree the surface or interfacial free energies of these surfaces." (Milton J. Rosen, "Surfactants and Interfacial Phenomena," Second Ed., John Wiley & Sons, New York, N.Y., 1989, page 1). The fluorinated polyether compositions according to the invention have been found to have these properties. In one aspect, the invention provides a method for altering, e.g., lowering, the surface energy and/or interfacial free energy, of a medium, the method comprising providing a medium and incorporating, e.g., dissolving, a fluorinated polyether composition as described herein in the medium.

In another aspect, the invention provides a composition comprising an organic or aqueous liquid having dissolved or dispersed therein a mixture of fluorinated polyethers as defined above.

In still a further aspect, the invention relates to a composition as described above, further comprising one or monomers capable of polymerization. A further aspect of the invention relates to a composition as described above, further comprising a fluorochemical compound capable of providing oil- and/or water repellency properties to a substrate. In yet another aspect the invention provides for a use of a composition as described above as a coating composition or fire-fighting agent.

In a further aspect, the invention provides for a mixture of fluorinated polyethers of the formula:

$$(R_f)_n\text{—}X_w\text{—}Z \tag{I}$$

wherein n is 1 or 2, w is 0 or 1, X is a divalent or trivalent organic linking group, Z is a polar group selected from the group consisting of an ammonium group, an amine-oxide group and an amphoteric group, and $R_f$ represents a perfluorinated polyether group of the formula:

$$CF_3CF_2CF_2\text{—}O\text{—}[CF(CF_3)CF_2O]_k\text{—}CF(CF_3)\text{—}$$

wherein k is at least 1;

said mixture of fluorinated polyethers having a weight average molecular weight between 750 g/mol and 5000 g/mol and the amount of perfluorinated polyether groups in said mixture where k is 2 or less, is not more than 10% by weight of the total amount of perfluorinated polyether groups in said mixture.

It has been found that compositions comprising fluorinated polyethers or mixtures thereof, having a molecular weight between 750 g/mol and 5000 g/mol provide compositions having good or excellent environmental properties combined with good or excellent surfactant properties. In particular, the surfactant properties are such that the surfactants can be used in a wide variety of applications. Furthermore, the compositions may be prepared without processing difficulties and the fluorinated polyethers or mixtures thereof can readily be dissolved or dispersed in water or an organic solvent or mixtures thereof.

The fluorinated polyether components of the compositions that have a perfluorinated polyether moiety having a molecular weight of at least 750 g/mol eliminate effectively from the body of living organisms and should not normally produce, under normal storage and use conditions, degradation products that cannot be effectively eliminated from the body of living organisms.

DETAILED DESCRIPTION OF ILLUSTRATIVE EMBODIMENTS OF THE INVENTION

The $R_f$ group in formula I represents a perfluorinated polyether group of formula:

$$CF_3CF_2CF_2\!-\!O\!-\![CF(CF_3)CF_2O]_k\!-\!CF(CF_3)\!-\!$$

wherein k is at least 1 and can be derived from the oligomerization of hexafluoropropylene oxide. It will be evident to one skilled in the art that mixtures of perfluorinated polyether groups will be formed. In a preferred embodiment, k is an integer of 3 to 25. When k equals 3, the perfluorinated polyether group has a molecular weight of 783. In a preferred embodiment the amount of perfluorinated polyether groups in said mixture where k is 2 or less, is not more than 10% by weight of the total amount of perfluorinated polyether groups in said mixture. More preferably, the amount of perfluorinated polyether groups in said mixture where k is 2 or less is not more than 5% by weight, most preferably not more than 1% by weight based on the total weight of perfluorinated polyether moieties in the composition. The lower the amount of perfluorinated polyether groups having a molecular weight of less than 750 g/mol, the better the environmental properties of the resulting composition will generally be.

Examples of organic linking groups X include non-fluorinated organic groups that comprise aromatic or aliphatic groups that may be interrupted by O, N, or S and that may be substituted, alkylene groups, oxy groups, thio groups, urethane groups, carboxy groups, carbonyl groups, amido groups, oxyalkylene groups, thioalkylene groups, carboxyalkylene, and/or amidoalkylene groups.

Typical examples of X include $-CONR^a-(CH_2)_s-$, wherein $R^a$ is hydrogen or $C_{1-6}$-alkyl or $C_{1-6}$-alkyl substituted by halogen, OH, or SH; and s is 1 to 20. Preferred examples of X further include $-CH_2O(CH_2)_s-$, $-C(O)O(CH_2)_s-$, $-C(O)S(CH_2)_s-$, $-O(CH_2)_s$ and $-CO[NHCH_2CH_2]NH_uCO-$ where u is 1 to 4; s is 1 to 20. A particularly useful linking group X is $-CONH(CH_2)_3-$.

The polar group Z can be selected from the group consisting of an acid group or salt thereof, an ammonium group, an amine-oxide group and an amphoteric group. In a particular preferred embodiment, the group Z can be represented by the formula:

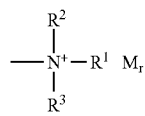

(II)

wherein each of $R^1$, $R^2$ and $R^3$ independently represents a hydrogen atom or a hydrocarbon group that may optionally be substituted, M represents a counter ion, r is 0 or 1 and when r is 0, one of $R^1$, $R^2$ and $R^3$ represents a hydrocarbon group that is substituted with an acid group, such as for example $-CH_2CH_2CH_2SO_3^-$.

Representative examples of M include $Cl^-$, $CH_3COO^-$, $C_2H_5SO_4^-$, $I^-$, $Br^-$, $CF_3SO_3^-$, $\frac{1}{2}SO_4^{2-}$.

In a further preferred embodiment, the group Z corresponds to the formula:

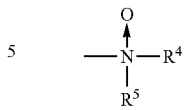

(III)

wherein $R^4$ and $R^5$ are independently $C_{1-6}$-alkyl, $C_{1-6}$-alkyl substituted by halogen, $C_{1-6}$-alkoxy, $NO_2$ or CN, or $R^4$ and $R^5$ may join to form a 5 to 7 membered ring that may contain one or more additional hetero atoms and that may be substituted by one or more $C_{1-6}$-alkyl groups.

Compounds according to formula (I) can conveniently be prepared through oligomerization of hexafluoropropylene oxide (HFPO), which results in a perfluoropolyether carbonyl fluoride. This carbonyl fluoride may be converted into an acid, ester or alcohol by reactions well known to those skilled in the art. The carbonyl fluoride, acid, ester or alcohol derived therefrom may then be reacted further to introduce the desired groups according to known procedures. For example, EP 870 778 describes suitable methods to produce compounds according to formula (I) having desired Q–Z moieties. For example quaternary ammonium compounds according to formula II can be prepared by reacting the fluorinated polyether ester compound, with an amine, such as, e.g., 3-(dimethylamino)-propylamine. The amine compound can further be quaternized through reaction with an acid, such as hydrochloric acid or acetic acid or alkylating agents, such as diethylsulfate, propane sultone, methyliodide, butylbromide or methylchloride. The fluorinated amine-oxide surfactants, according to formula III can be prepared by treating the fluorinated amine precursor with hydrogen peroxide or peracid, such as perbenzoic acid or peracetic acid. This reaction may be carried out at elevated temperatures, for example at about 60° C. to 70° C.

The method of making the fluorinated polyether surfactants according to formula (I) will result in a mixture of fluorinated polyethers that have different molecular weights. The molecular weight range of the surfactants can be tailored via fractional distillation of the fluorinated polyether acid fluoride or ester precursor. In a preferred embodiment, such a mixture of fluorinated polyether compounds according to formula (I) contains fluorinated polyether compounds having a perfluorinated polyether moiety having a molecular weight of less than 750 g/mol in an amount of not more than 10% by weight relative to total weight of fluorinated polyether compounds, preferably not more than 5% by weight and most preferably not more than 1% by weight. The fluorinated surfactants typically will have a weight average molecular weight such that it is readily dissolved or dispersed in water or an organic solvent or mixtures thereof. Generally, the weight average molecular weight of the fluorinated polyether is not more than 5000 g/mol, preferably not more than 4000 g/mol with a typical range being between 750 g/mol and 2500 g/mol.

The mixture of fluorinated polyethers can be dispersed or dissolved in water or an organic liquid or mixtures thereof. Organic liquids that can be used in the fluorinated polyether compositions include aliphatic and alicyclic hydrocarbons (e.g., hexane, heptane, cyclohexane), aromatic solvents (e.g., benzene, toluene, xylene), ethers (e.g., diethylether, glyme, diglyme, diisopropyl ether), alkoxy alkylene ethers (e.g. dipropylene glycol monomethylether, triethyleneglycol), esters (e.g., ethyl acetate, butyl acetate), alcohols (e.g., ethanol, isopropyl alcohol), ketones (e.g., acetone, methyl-ethyl ketone, methyl isobutyl ketone), sulfoxides (e.g., dimethyl sulfoxide), amides (e.g., N,N-dimethylformamide, N,N-dimethylacetamide, N-methylpyrrolidinone), halogenated solvents selected from the group consisting of hydrofluoroethers, hydrofluorocarbons and chlorinated solvents, such as methylchloroform, FREON™ 113, trichloroethylene, α,α,α-trifluorotoluene, and mixtures thereof.

The mixture of fluorinated polyethers has been found to have good or excellent surfactant properties such that the mixture can be used in a wide variety of applications where surfactant properties are desired and/or needed. In particular, the mixture of fluorinated polyethers is very effective in reducing the surface tension of liquids. Similarly, the mixture can improve the wetting of a surface of a substrate by a liquid or coating mixture.

In one embodiment, a composition comprising the mixture of fluorinated polyethers can be used as an emulsifying agent or stabilizer in emulsion or dispersion polymerization of one or more monomers.

In a particular embodiment, the mixture of fluorinated polyethers can act as a surfactant in an aqueous emulsion polymerization of fluorinated monomers (fluoromonomers) with optional fluorinated and non-fluorinated comonomers to form fluoropolymers. The fluoropolymers may have a partially fluorinated backbone, generally at least 40% by weight fluorinated, or a fully fluorinated backbone. Examples of fluoromonomers include fluorinated ethylenically-unsaturated monomers such as, for example, tetrafluoroethylene, vinylidene fluoride, trifluoroethylene, chlorotrifluoroethylene, hexafluoropropene, vinyl fluoride, and pentafluoropropene. Optional comonomers include perfluorovinyl ethers such as perfluoro(methyl vinyl) ether, perfluoro(methoxyethyl vinyl) ether, perfluoro (propyl vinyl) ether, perfluoro (2-(n-propoxy)propyl vinyl) ether, and perfluoro(ethoxyethyl vinyl) ether, Examples of non-fluorinated comonomers include ethylene and propylene.

Processes for polymerizing fluorinated monomers as described above, with optional comonomers in aqueous media are well known and described for example in U.S. Pat. Nos. 3,271,341, 6,395,848 and 6,429,258, EP 0 625 526, and WO 02/095121. The mixture of fluorinated polyethers can be used in these processes as an alternative for the fluorinated surfactants described in these references. While the known emulsion polymerization process of fluoromonomers has typically been carried out with anionic fluorinated surfactants, the mixture of fluorinated polyethers that can be used in the emulsion polymerization process is not limited to mixtures of anionic fluorinated polyethers. Indeed it has been found that also cationic fluorinated polyether mixtures can be used in the aqueous emulsion polymerization. This offers the advantage that also cationically stabilized fluoropolymer dispersions can be produced in a convenient way. Generally, the mixture of fluorinated polyethers should be used in amounts between 0.5% and 10% by weight, based on the total weight of the monomers present and the emulsion polymerization of the fluoromonomers can be conducted in the known and common way.

Typically the emulsion polymerization is carried out in the presence of a free radical initiator. Typically utilized free radical initiators include diisopropyl peroxydicarbonate and permanganate compounds of the formula $QMnO_4$ where Q is hydrogen, ammonium, alkali earth metal, or alkaline earth metal or a redox system such as hydrogen peroxide/ascorbic acid combinations. One or more chain transfer agents, such as isopropyl alcohol, may also be used to control the molecular weight of the polymer. Polymerization may be effected by mixing the foregoing ingredients in aqueous media at a temperature typically between about 50 and 125° C. and a pressure typically between about 7 and 40 kg/cm² and generally is carried out in a gently stirred autoclave.

In yet another embodiment, the fluorinated polyether surfactant compositions can be used as a stabiliser in the polymerization of fluorochemical monomers, having a fluorinated group and an ethylenically unsaturated group free of fluorine, and optional non-fluorinated comonomers. It has been found that the mixture of fluorinated polyethers acts as an effective emulsifier or surfactant in the emulsion polymerization such that emulsions of good stability are obtained together with a high yield of polymer solids.

In a particular embodiment, the fluorochemical monomers correspond to the general formula:

$$R^2_f\text{—}Q^1\text{—}E^1 \qquad (IV)$$

wherein $R^2_f$ represents a fluoroaliphatic group containing at least 3 carbon atoms or a fluorinated polyether group. $Q^1$ represents an organic divalent linking group, typically an non-fluorinated group and $E^1$ represents a non-fluorinated free radical polymerizable group.

The fluorinated monomer is typically an ester of an α,β-ethylenically unsaturated carboxylic acid and contains a fluoroaliphatic group. Examples of fluorochemical monomers include:

$$CF_3CF_2CF_2CF_2CH_2CH_2OCOCR^1\text{=}CH_2$$

$$CF_3(CF_2)_2CH_2OCOCR^1\text{=}CH_2$$

$$CF_3(CF_2)_3SO_2N(CH_3)CH_2CH_2OCOCR^1\text{=}CH_2$$

$$CF_3(CF_2)_3SO_2N(C_2H_5)CH_2CH_2OCOCR^1\text{=}CH_2$$

$$CF_3(CF_2)_3SO_2N(CH_3)CH_2CH(CH_3)OCOCR^1\text{=}CH_2$$
and $$(CF_3)_2CFCF_2SO_2N(CH_3)CH_2CH_2OCOCR^1\text{=}CH_2$$

wherein $R^1$ is hydrogen or methyl.

The non-fluorinated comonomer is typically a monomer comprising a polymerizable group and a hydrocarbon group, which may optionally be substituted. For example the non-fluorinated monomer may be a hydrocarbon group containing monomer having an aliphatic group of 1 to 30 carbon atoms and an ethylenically unsaturated group. The hydrocarbon group is preferably selected from the group consisting of a linear, branched or cyclic alkyl group, an aralkyl group, an alkylaryl group and an aryl group. Typical examples of non-fluorinated monomers include those selected from isobutyl (meth)acrylate, butyl (meth)acrylate, 2-ethylhexyl (meth)acrylate, 2-hydroxyethyl methacrylate, lauryl (meth)acrylate, methyl methacrylate, octadecyl(meth)acrylate, N-hydroxymethyl acrylamide, methoxy polyethyleneglycol methacrylate, N-hydroxymethyl acrylamide and urethane (meth)acrylate type monomers. Further non-fluorinated comonomers include for example chlorine containing monomers, such as, e.g., vinylchloride and vinylidene chloride.

Typically the polymerization is a free radical polymerization. The surfactants can be used alone or in combination with further co-surfactants. Alternatively, the polymerization may be done in an organic solvent, followed by a post-emulsification using the mixture of fluorinated polyethers as stabilizer.

Free radical polymerization of the above fluorochemical monomers optionally in combination with one or more non-fluorinated monomers can be thermally or photochemically initiated by use of a free radical initiator. Useful free radical initiators are known in the art and include azo compounds, such as azobisisobutyronitrile (AIBN), azobis-valeronitrile and azobis(2-cyanovaleric acid), 2,2'-azobis(2-amidinopropane)dihydrochloride and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

The polymerisation may further be carried out in the presence of a chain transfer agent or a chain terminator to tailor the molecular weight and/or properties of the resulting fluorinated copolymer.

In order to stabilise the polymerization medium, the mixture of fluorinated polyethers will typically be added in amounts between about 1% and 15% by weight based on the total weight of the monomers present.

In a further embodiment, the mixture of fluorinated polyethers is used as a surfactant in compositions comprising an aqueous or organic solvent and a fluorochemical compound capable of providing oil- and/or water repellency properties. The mixture of fluorinated polyethers may be dispersed or dissolved in the composition and is typically used in these compositions to obtain a homogeneous and stable mixture of the fluorochemical compound. Such a composition can be used to provide oil- and water repellent properties to a substrate including for example fibrous substrates as well as hard surfaces such as glass or ceramic articles.

Examples of fluorochemical compounds suitable for providing oil- and/or water repellency properties include fluorochemical acrylates and methacrylates, as may be obtained as described above or as taught for example in EP 1329548, fluorochemical urethanes as described in for example U.S. Pat. No. 5,910,557, fluorochemical esters as described in, for example, U.S. Pat. Nos. 6,288,157 and 6,525,127 and fluoropolymers as is taught in for example WO 02/095121.

The fluorochemical treatment composition comprising a fluorochemical compound and the mixture of fluorinated polyethers can be applied to a substrate. The substrates that can be treated by the fluorochemical composition are not especially limited and include for example fibrous substrates, such as textile and carpet. The fibrous substrate may be based on synthetic fibers, e.g., polyester, polyamide and polyacrylate fibers or natural fibers, e.g., cellulose fibers as well as mixtures thereof. The fibrous substrate may be a woven as well as a non-woven substrate. The treated substrates have good repellency properties, in particular the treated substrates are readily repellent to water and oils.

The mixture of fluorinated polyethers should generally be used in amounts effective to obtain a stable treatment composition. However the amount of the mixture of fluorinated polyethers is preferably kept as low as possible so as to not adversely affect the repellent properties. It has been found that the mixture of fluorinated polyethers is highly effective in obtaining compositions of desired stability even at low amounts. Typically the mixture of fluorinated polyethers may be used in amounts between 1% and 15%, preferably between 2% and 10%, by weight based on the total solids weight.

In a further particular embodiment of the present invention, a composition comprising the mixture of fluorinated polyethers and a fluorochemical compound can be used as a treatment composition to render substrates, having a hard surface, such as ceramics or glass, oil and water repellent.

Fluorochemical compounds suitable for use in such a treatment composition for hard surfaces are typically fluorosilanes. Fluorosilanes typically comprise one or more fluorinated groups and one or more silyl groups having one or more hydrolyzable groups. By the term "hydrolyzable group" is meant that the groups are capable of hydrolyzing under the conditions used to prepare the fluorinated treatment composition and/or the conditions to apply the fluorinated composition to the substrate. Such conditions may involve the use of a catalyst such as an acid or base. Examples of suitable hydrolyzable groups include alkoxy groups, aryloxy groups, halogens such as chlorine, acetoxy groups and acyl groups. Generally preferred are lower alkoxy groups having 1 to 4 carbon atoms.

The fluorosilane may contain one or more, for example, two or three, silane groups linked directly to a fluorinated group or they may be linked to a fluorinated group through an organic linking group. Such an organic linking group is generally a non-fluorinated group such as a hydrocarbon group and may contain one or more heteroatoms.

The fluorosilane may comprise one or more fluorinated groups including fluoroaliphatic groups and fluorinated polyether groups. The fluorinated group(s) of the fluorosilane may be partially or fully fluorinated and may be monovalent or multivalent, e.g., divalent.

Examples of preferred fluorosilanes include, but are not limited to, the following approximate average structures:

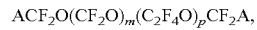
$ACF_2O(CF_2O)_m(C_2F_4O)_pCF_2A$,

$C_3F_7O(CF(CF_3)CF_2O)_pCF(CF_3)A$,

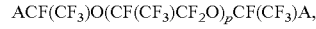
$ACF(CF_3)O(CF(CF_3)CF_2O)_pCF(CF_3)A$,

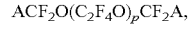
$ACF_2O(C_2F_4O)_pCF_2A$,

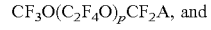
$CF_3O(C_2F_4O)_pCF_2A$, and

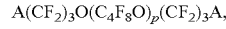
$A(CF_2)_3O(C_4F_8O)_p(CF_2)_3A$, wherein —A is —B—$SiY_{3-x}{}^1R_x$, B represents an organic linking group, $Y^1$ is a hydrolysable group and R represents a $C_1$–$C_4$ alkyl group, x is 0, 1 or 2 and an average value for m and p is 0 to 50, with the proviso that m and p are not simultaneously 0. The values of m and p in these approximate average structures can vary. Preferably, an average value of m is within a range of about 1 to about 50, and an average value of p is within a range of about 4 to about 40.

Fluorinated compounds including fluoropolyether groups are taught for example in U.S. Pat. Nos. 6,613,860; 6,592,659 and published US application no. 2003/0113555.

The compositions used for the treatment of hard surfaces may also include an acid or base catalyst. The acid catalyst, if present, comprises an organic or inorganic acid. Organic acids include acetic acid, citric acid, formic acid and the like. Examples of inorganic acids include sulphuric acid, hydrochloric acid and the like. The acid will generally be included in the composition in an amount between about 0.01 and 10%, more preferably between 0.05 and 5% by weight. The base catalyst, if present, comprises for example sodium or potassium hydroxide or an amine containing compound.

The treatment composition may further comprise one or more auxiliary compounds of an element $M^2$ selected from the group consisting of Si, Ti, Zr, B, Al, Ge, V, Pb and Sn and having at least two hydrolysable groups per molecule in an amount sufficient to form a polycondensation product upon reaction with said fluorochemical oligomer. Examples include tetramethoxysilane, tetra ethoxysilane, methyl triethoxysilane, dimethyldiethoxysilane, octadecyltriethoxysilane, methyl trichlorosilane, tetra-methyl orthotitanate, tetra ethyl orthotitanate, tetra-iso-propyl orthotitanate, tetra-n-propyl orthotitanate, tetraethyl zirconate, tetra-iso-propyl zirconate tetra-n-propyl zirconate and the like.

The treatment composition is typically a solution or dispersion in water and can be applied to the substrates by methods known in the art and described for example in U.S. Pat. Nos. 6,613,860 and 6,592,659 and U.S. patent application No. 2003/0113555.

Suitable substrates that can be treated in a particularly effective way with the fluorinated composition comprising an organic or aqueous liquid having dissolved or dispersed therein a mixture of fluorinated polyethers and a fluorosilane, include substrates having a hard surface that preferably has groups capable of reacting with the fluorosilane. Particularly preferred substrates include ceramics, glass, metal, natural and man-made stone and wood.

In still further embodiment, the mixture of fluorinated polyethers can be used in fire fighting formulations for fighting polar and non-polar fuel and solvent fires. Fire fighting concentrates typically comprise fluorinated surfactants, fluorine-free surfactants, foam stabilizers, and optional further additives.

These concentrates typically are designated as 1%, 3%, or 6% concentrates and are diluted with 99%, 97%, or 94% fresh or sea water respectively to form a premix. The premix must exhibit good foaming characteristics to produce a thick foam blanket that achieves rapid knock down, control, extinguishment, and resistance to reignition of the fire and persists for a significant time after the fire's extinguishment. The surfactants detailed herein find particular utility in the formulation of aqueous film-forming foam (AFFF) concentrates such as those used to extinguish hydrocarbon and other flammable liquid fires. Because of the remarkably low surface tensions achieved by the mixture of fluorinated polyethers, the surface tension of these aqueous solutions is depressed well below the surface tension of a flammable liquid so that a vapor-sealing film draining from their foam readily spreads over the flammable liquid. As a consequence, films produced by these solutions have a strong tendency to reform if disturbed or broken thereby reducing the tendency of a fire to reignite where the film has been disturbed, for example, by wind blowing over the surface of the foam.

AFFF (i.e., concentrates) typically comprise an aqueous solution of the mixture of fluorinated polyethers and one or more water-soluble substantially fluorine-free surfactants. While any of the mixtures of fluorinated polyether surfactants described herein may be employed in AFFF concentrates, mixtures of amphoteric and amine oxide type of fluorinated polyethers are particularly preferred. One or more additional fluoroaliphatic amphoteric and/or anionic surfactants, such as a fluorinated aminocarboxylate or a perfluoroalkane sulfonate, may also be added to the formulation although such may not be necessary or needed. Examples of additional surfactants that may be added include those described in U.S. Pat. No. 5,085,786 (Alm et al).

Additional components may optionally be added to the AFFF concentrates as is known in the art and disclosed for example in U.S. Pat. No. 5,085,786 (Alm et al.) and U.S. Pat. No. 3,772,195 (Francen). Typically, between 1 and 10 percent by weight of the mixture of fluorinated polyethers and between 1 and 30 percent by weight of the fluorine-free surfactant or surfactants should be employed to make the AFFF concentrate.

In a further embodiment of the invention, the mixture of fluorinated polyethers find utility in aqueous film forming formulations for the extinguishment of polar solvents, such as alcohols, ketones, esters and ethers. Fire fighting foam concentrates for polar solvents generally contain, as a key component, water soluble or swellable polymeric materials, e.g., polysaccharides or protein hydrolysates. They cause the aqueous foam to form a gelatinous 'mat' or membrane when it comes in contact with a polar hydrophilic liquid and prevents the foam from collapsing due to water drainage. The foam concentrate further comprises non-fluorinated surfactants as mentioned above.

In the latter fire fighting compositions, the mixture of fluorinated polyethers should typically be used in an amount of from about 1 to about 6% by weight, preferably between about 1.5 and about 4% by weight; and the non-fluorinated surfactant is conveniently used in an amount of from about 1 to about 10% by weight, preferably in an amount of from about 2 to about 8% by weight.

Optionally, other polymeric stabilizers and thickeners can be incorporated into the concentrate compositions to enhance the foam stability of the foam produced by aeration of the aqueous solution made from the concentrate. Examples of concentrates comprising fluorochemical oligomers and polysaccharide have been disclosed for example in EP 912213.

The above embodiments are some of the applications in which the surfactant properties of the mixture of fluorinated polyethers can be used without however excluding that the mixture may be used in other applications as well where surfactant properties are desired. The invention will now be further illustrated by means of specific examples without however the intention to limit the invention thereto.

EXAMPLES

Test Methods

Surface Tension

The surface tension of aqueous solutions was determined using the Wilhelmy plate method or the Du Nouy ring method.

Wilhelmy Plate Method

The surface tension was determined using a Kruss K12 Tensiometer. The tensiometer was integrated with an automatic dosimat and a computer, using a software package for dynamic contact angle (K121). The program was run using a Wilhelmy platinum plate (PL12) and glass sample vessel (GL7).

Du Nouy Ring Method

The fluoropolyether surfactants were diluted in water to various concentrations as given in the respective examples and the surface tension of the aqueous solution was measured using the Du Nouy ring method, using a Kruss K10ST instrument, according to ASTM D-1331.

Spray Rating (SR)

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and was expressed in terms of a 'spray rating' of the tested substrate. The spray rating was obtained by spraying 250 ml water on the substrate from a height of 15 cm. The wetting pattern was visually rated using a 0 to 100 scale, where 0 means complete wetting and 100 means no wetting at all.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

Standard Test Liquids

| AATCC Oil Repellency Rating Number | Compositions |
|---|---|
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Bundesmann Test

The impregnating effect of rain on treated substrates was determined using the Bundesmann Test Method (DIN 53888). In this test, the treated substrates were subjected to a simulated rainfall, while the back of the substrate was being rubbed. The appearance of the upper exposed surface was checked visually after 1, 5 and 10 minutes and was given a rating between 1 (complete surface wetting) and 5 (no water remains on the surface).

Foam Stability Test

Foams were produced by making 100 ml of a 3% foam premix by diluting by weight 3 parts foam concentrate with 97 parts fresh or synthetic sea water (composition according to ASTM D 1141-52), and foaming the resultant premix using a Kalorik-type 5353 kitchen blender at highest speed for 10 sec. Then 50 g of the foam was poured over a 30 second time period onto 250 g solvent contained in a 19 cm diameter×8 cm high glass dish. The foam was poured onto the solvent in such a way that it spread over and across the solvent from one end of the dish to the other and completely covered the surface of the solvent. The time required for 50% of the foam area to collapse from the first moment the foam touched the solvent was recorded.

Foam Expansion/Drain Time

Foam expansion and drain time were measured in accordance with US Department of Defense Military Specification No. MIL-F-243 8 5, Revision F, Section 4.7.5, using the standard National Foam Systems 2 gal/min nozzle.

Film Forming Test

Cyclohexane was poured in a petri dish having 10 cm diameter and 1 cm height until the cyclohexane reached a depth of 0.5 cm. Twenty drops of a 3% premix was gently put on the cyclohexane surface using an eyedropper over a period of 20 seconds. The film formed was allowed to spread during 30 sec. A burning match was passed over the dish. If the cyclohexane did not ignite, the film passed the vapour sealing.

Contact Angles

Treated substrates were tested for their contact angles versus water (W) and n-hexadecane (O) using an Olympus TGHM goniometer. The contact angles were measured before (initial) and directly after abrasion (abrasion), unless otherwise indicated. The treated substrates were abraded using an Erichsen cleaning machine, 3M High Performance Cloth (available from 3M) and CIF cleaner (available from Lever), using 40 cycles. The values are the mean values of 4 measurements and are reported in degrees. The minimum meaningful value for a contact angle is 20°.

ABBREVIATIONS

The following abbreviations are used herein:

Witcolate™ 7093 surfactant: a C6–C10 alkyl ether sulfate surfactant, available from Witco Kelzan™ gum: a polysaccharide (xantham gum), available from Kelco MeFBSEMA: N-methyl perfluorobutyl sulfonamido ethylmethacrylate EtFOSEMA: N-ethyl perfluorooctyl sulfonamido ethylmethacrylate ECC-1000: Fluoropolymer, commercially available from 3M Company PPVE-2: perfluoropropoxypropyl vinyl ether VDF: vinylidene fluoride HFP: hexafluoropropylene $VCl_2$: vinylidenechloride IPA: isopropylalcohol DMAPA: dimethylaminopropyl amine DETA: diethylene triamine TEPA: tetraethylene pentamine TETA: triethylenetetramine PAμ: polyamide microfiber PES/CO: polyester/cotton PESμ: polyester microfiber APFO: ammonium perfluoro octanoate V-50: 2,2'-Azobis(2-amidinopropane) dihydrochloride, available from Wako Steol: alkylether sulphonate sodium salt, available from Witco Starpol™: starch, available from Cerestar Synthesis of Mixture of Fluorinated Polyethers Several mixtures of fluorinated polyethers were prepared starting from fluorinated polyether esters $CF_3CF_2CF_2$—O—$(CF(CF_3)CF_2O)_kCF(CF_3)COOCH_3$, consisting of a mixture of oligomers with different chain lengths. The index k is indicative of the mathematical average of the number of repeating polyether units. The percentage of oligomeric esters with a fluorinated polyether group having a molecular weight lower than 750 g/mol was 4.2% for the fluorinated polyether ester $CF_3CF_2CF_2$—O—$(CF(CF_3)CF_2O)_kCF(CF_3)COOCH_3$ with k=6.26 (average Mw=1382.5 g/mol), 5.5% for k=6.14 (average Mw=1362.8 g/mol), 2.8% for k=7.38 (average Mw=1569.7 g/mol) and 3.1% for k=7.98 (average Mw=1669 g/mol). The oligomeric ester having an average molecular weight of 1362.8 g/mol and average k=6.14, was subjected to fractional distillation so as to remove the low molecular weight dimer, trimer and tetramer homologues. After distillation, the oligomeric ester, indicated as HFPO-pur, had 0% of fluorinated polyether group having a molecular weight lower than 750 g/mol, an average weight average molecular weight of 1438.6 and an average k value of 6.59.

The structure of the fluorinated polyether surfactants is given in Table 1.

1. Synthesis of a Mixture of Fluorinated Polyether Amine Derivatives and Salts Thereof.

Fluorochemical polyether amine derivatives $C_3F_7O(C_3F_6O)_kCF(CF_3)CONHCH_2CH_2CH_2N(Me)_2$ were made according to the following procedure: A 100 ml reaction flask was charged with 35.3 mmoles $C_3F_7O(C_3F_6O)_kCF(CF_3)COOMe$ (C=O peak in IR at 1793 cm$^{-1}$).

3-(Dimethylamino)propylamine (37.0 mmole) was slowly added with a syringe, while stirring. The reaction was run for 2 hrs at 65° C. Reaction completion was confirmed via GC and FT-IR analysis (C=O peaks at 1725 and 1532 cm$^{-1}$). The reaction product was obtained as a clear, colorless oil. The amine salts were prepared by diluting the amine derivatives with water and neutralizing in situ with 1% of a 5N HCl solution or with acetic acid.

2. Synthesis of a Mixture of Fluorinated Polyether Quaternary Ammonium Surfactants Several mixtures of fluorinated polyether amine derivatives $C_3F_7O(C_3F_6O)_kCF(CF_3)CONHCH_2CH_2CH_2N(Me)_2$, prepared as given in the proceduere above, were converted to the corresponding quaternary ammonium derivatives $C_3F_7O(C_3F_6O)_kCF(CF_3)CONHCH_2CH_2CH_2N(Me)_2Et^+$ $EtSO_4^-$ according to the following procedure:

A 100 ml reaction flask was charged with 17.4 mmol $C_3F_7O(C_3F_6O)_kCF(CF_3)CONHCH_2CH_2CH_2N(Me)_2$ and IPA to obtain a 65% concentrate. Diethylsulfate (18.3 mmol, 2.82 g) was slowly added with a syringe, while stirring. The turbid reaction mixture was stirred at 65° C. for 2 hrs. Deionized water was added to obtain a 50% mixture and the reaction was continued for 3 hrs at 65° C. The reaction product was a clear, slightly yellow liquid.

3. Synthesis of Mixtures of Fluorinated Polyethers amine-oxide Surfactants

In order to prepare fluorochemical polyether amine-oxide surfactants, the fluorochemical polyether derivatives $C_3F_7O$ $(C_3F_6O)_kCF(CF_3)CONHCH_2CH_2CH_2N(Me)_2$ were converted to the corresponding $C_3F_7O(C_3F_6O)_kCF(CF_3)$ $CONHCH_2CH_2CH_2N->O(Me)_2$ as follows:

A 100 ml reaction flask was charged with 21.14 mmoles $C_3F_7O(C_3F_6O)_kCF(CF_3)CONHCH_2CH_2CH_2N(Me)_2$ and IPA to obtain a 50% mixture. 2.52 g of a 30% aqueous solution of $H_2O_2$ (22.2 mmoles) was slowly added with a syringe, while stirring. The reaction was run at 65° C. overnight. Reaction completion was confirmed via FT-IR analysis (C=O at 1714 and 1542 cm$^{-1}$). The final reaction mixture was a clear, colorless, non-viscous solution.

4. Synthesis of Mixtures of Fluorinated Polyethers Amphoteric Surfactants

Mixtures of fluorinated polyether amphoteric surfactants were made as follows:

A 250 ml flask was charged with 0.02 moles of $C_3F_7O$ $(C_3F_6O)_kCF(CF_3)COOMe$. 1 g (0.01 mol) of DETA (diethylenetriamine) were added under stirring. The reaction was run for 2 hrs at 40° C. under nitrogen. Reaction completion was confirmed by FT-IR. A clear, slightly yellow oil was obtained. Then 1.2 g (0.01 mol) of propanesultone (PS) was added at 40° C. An exothermic reaction was noticed. The mixture was heated to 60° C. for 3 hrs under nitrogen. The reaction mixture was then diluted with a 50/50 mixture of IPA/DI-water to obtain a 20% clear solution.

5. Synthesis of Mixtures of Fluorinated Polyethers Anionic Surfactants

Mixtures of fluorinated polyether anionic surfactants $C_3F_7O(C_3F_6O)_kCF(CF_3)COO^-NH_4^{+30}$ were prepared by neutralizing the corresponding acid with equimolar amounts of ammoniumhydroxide in a mixture of IPA/DI water 50/50 at 10% solids.

TABLE 1

Compositions

| Surf No | Type | Structure |
|---|---|---|
| Surf-1 | Amine salt | $C_3F_7O(C_3F_6O)_{6.14}CF(CF_3)CONHCH_2CH_2CH_2NH(Me)_2{}^+Cl^-$ |
| Surf-2 | Amine salt | $C_3F_7O(C_3F_6O)_{7.98}CF(CF_3)CONHCH_2CH_2CH_2NH(Me)_2{}^+Cl^-$ |
| Surf-3 | Amine salt | $C_3F_7O(C_3F_6O)_{7.38}CF(CF_3)CONHCH_2CH_2CH_2NH(Me)_2{}^+Ac^-$ |
| Surf-4 | Quaternary ammonium | $C_3F_7O(C_3F_6O)_{6.14}CF(CF_3)CONHCH_2CH_2CH_2NEt(Me)_2{}^+EtSO_4{}^-$ |
| Surf-5 | Quaternary ammonium | $C_3F_7O(C_3F_6O)_{7.98}CF(CF_3)CONHCH_2CH_2CH_2NEt(Me)_2{}^+EtSO_4{}^-$ |
| Surf-6 | Quaternary ammonium | $C_3F_7O(C_3F_6O)_{7.38}CF(CF_3)CONHCH_2CH_2CH_2NEt(Me)_2{}^+EtSO_4{}^-$ |
| Surf-7 | Amphoteric | $C_3F_7O(C_3F_6O)_{7.38}CF(CF_3)CONHCH_2CH_2CH_2NH(Me)_2{}^+(CH_2)_3SO_3{}^-$ |
| Surf-8 | Amine-oxide | $C_3F_7O(C_3F_6O)_{6.14}CF(CF_3)CONHCH_2CH_2CH_2N->O(Me)_2$ |
| Surf-9 | Amine-oxide | $C_3F_7O(C_3F_6O)_{7.98}CF(CF_3)CONHCH_2CH_2CH_2N->O(Me)_2$ |
| Surf-10 | Amine-oxide | $C_3F_7O(C_3F_6O)_{7.38}CF(CF_3)CONHCH_2CH_2CH_2N->O(Me)_2$ |
| Surf-11 | Anionic | $C_3F_7O(C_3F_6O)_{6.14}CF(CF_3)COO^-NH_4{}^+$ |
| Surf-12 | Anionic | $C_3F_7O(C_3F_6O)_{7.98}CF(CF_3)COO^-NH_4{}^+$ |
| Surf-13 | Amine-oxide | HFPO-pur/DMAPA/amine oxide |
| Surf-14 | Amphoteric | HFPO-pur/DMAPA/propanesultone |
| Surf-15 | Amine salt | HFPO-pur/DMAPA/acetic acid |
| Surf-16 | Amine salt | HFPO-pur/DETA/acetic acid |
| Surf-17 | Amphoteric | 2 HFPO-pur/TEPA/3 propanesultone |
| Surf-18 | Quaternary ammonium | HFPO-pur/TETA/3 diethylsulphate |

Note:
HFPO-pur = $CF_3CF_2CF_2-O-(CF(CF_3)CF_2O)_{6.59}CF(CF_3)COOCH_3$

Examples 1 to 18 and Comparative Example C-1

In Examples 1 to 18, aqueous solutions were made of the mixtures of fluorinated polyether surfactants at various concentrations. In a first step, the surfactant concentrates were diluted with deionised water to obtain a stock solution of 1–3%. Further dilutions were made starting from this stock solution. In order to obtain a homogeneous stock solution for surfactants 8 and 9, the concentrate was diluted with a mixture of deionised water/IPA at a ratio of respectively 90/10 and 60/40. The surface tension was measured using the Wilhelmy plate method or the Du Nouy ring method as indicated in Table 2. As comparative example, aqueous solutions of ammonium perfluorooctanoate (APFO) were made and tested for their surface tension. The results are given in Table 2.

TABLE 2

Surface tension of fluorinated polyether mixtures

| Ex | Surfactant | Method | Surface tension (mN/m)/ concentration (ppm) | | |
|---|---|---|---|---|---|
| | | | 10 ppm | 100 ppm | 1000 ppm |
| 1 | Surf-1 | Wilhelmy | 54.4 | 28.8 | 23.5 |
| 2 | Surf-2 | Wilhelmy | 72.2 | 62.2 | 43.6 |
| 3 | Surf-3 | Du Nouy | 60.0 | 27.6 | 19.2 |
| 4 | Surf-4 | Wilhelmy | 67 | 37.3 | 25.3 |
| 5 | Surf-5 | Wilhelmy | 71.2 | 37.8 | 22.5 |
| 6 | Surf-6 | Du Nouy | 57.8 | 26.5 | 17.4 |
| 7 | Surf-7 | Du Nouy | 55.4 | 26.0 | 18.7 |
| 8 | Surf-8 | Wilhelmy | 58.6 | 19.2 | 18.5 |
| 9 | Surf-9 | Wilhelmy | 65.8 | 30.5 | 19.5 |
| 10 | Surf-10 | Du Nouy | 53.5 | 25.9 | 18.4 |
| 11 | Surf-11 | Wilhelmy | 57.7 | 45.1 | 34.4 |
| 12 | Surf-12 | Wilhelmy | 71.9 | 55 | 40.8 |
| 13 | Surf-13 | Wilhelmy | 55.9 | 23.2 | 18.6 |
| 14 | Surf-14 | Wilhelmy | 60.4 | 28.9 | 18.9 |
| 15 | Surf-15 | Wilhelmy | 62 | 24.5 | 18.3 |
| 16 | Surf-16 | Wilhelmy | 55.2 | 26.5 | 20.5 |
| 17 | Surf-17 | Wilhelmy | 68.2 | 28.8 | 22 |
| 18 | Surf-18 | Wilhelmy | 60.4 | 25.3 | 18.9 |
| C-1 | APFO | Wilhelmy | NA | 68.2 | 57.4 |

Note:
NA: not available

The results indicated that the mixtures of fluorinated polyether surfactants gave a very efficient surface tension reduction of aqueous solutions, even at low concentrations.

Examples 19 and 20

In Examples 19 and 20, fluorochemical acrylate MeFBSEA/VCl$_2$ 80/20 (w/w) emulsion copolymers were made, using 3% by weight (based on monomer content) of fluorinated polyether surfactants 1 and 2 respectively. Therefore, a 100 ml polymerization bottle was charged with 16 g MeFBSEA, 38.5 g deionized water, 9.6 g acetone, 0.6 g $C_3F_7O(C_3F_6O)_kCF(CF_3)CONHCH_2CH_2CH_2N(Me)_2$, 0.5 g 5 N HCl (to form the amine-HCl salt), 0.1 g V-50 initiator and 0.05 g n-octyhnercaptane. The bottle was degassed using waterjet vacuum and the vacuum broken with N$_2$ (repeat 4 times). After adding 4 g VCl$_2$ the bottle was sealed with a metal cap and run in a pre-heated Launder-o-meter at 72° C. for 6 hrs. A stable, milky latex was obtained in 96.7% yield (measured by solids). The composition of the polymers and the yield is given in table 3. The emulsion polymers were tested for their oil and water repellent properties. Therefore, substrates were treated with the fluorochemical emulsion by pad application, to provide a concentration of 0.3% solids (based on fabric weight and indicated as SOF (solids on fabric)) and drying the samples at 160° C. during 1.5 minutes. The oil and water repellency were tested and the results are given in tables 3 and 4.

TABLE 3

Oil and water repellent properties of substrates treated with MeFBSEA/VCl$_2$

| Ex No | Surf | Yield | Cotton | | PES/CO | | PAµ | | PESµ | |
|---|---|---|---|---|---|---|---|---|---|---|
| | | | OR | SR | OR | SR | OR | SR | OR | SR |
| 19 | Surf-1 | 96.7 | 0 | 50 | 2 | 70 | 2 | 100 | 1 | 100 |
| 20 | Surf-2 | 96.7 | 0 | 0 | 0.5 | 70 | 2.5 | 100 | 0 | 100 |

TABLE 4

Bundesmann test

| | PAµ | | | PESµ | | |
|---|---|---|---|---|---|---|
| Ex | 1' | 5' | 10' | 1' | 5' | 10' |
| 19 | 4 | 3 | 1 | 5 | 2 | 1 |
| 20 | 3 | 1 | 1 | 4 | 2 | 1 |

The results indicated that emulsion polymers were obtained at high yield (>96%). Furthermore, compositions comprising the emulsion copolymers and mixtures of fluorinated polyether amine-salts provide treated substrates with excellent dynamic water repellency (SR and Bundesmann).

Examples 21 and 22

In Examples 21 and 22, fluoropolyether surfactant mixtures 4 and 5 were used as stabilizers in the polymerization of fluorochemical monomers VDF, HFP and PPVE-2. Example 21 was made as follows: in a 500 ml glass reactor, 12.8 g surfactant mixture 4 was added to 335.5 g deionized water. After the two were mixed, 72.0 g perfluoropropoxypropyl vinyl ether (PPVE-2) was added to that surfactant solution and sonicated for 60 s using a sonic horn to form a coarse emulsion. That coarse emulsion was further homogenized at 8800 psi for 3 passes using a two-stage Gaulin 15MR to yield a fine emulsion with a mean droplet diameter of 206 nm. Then, 1.0 g of a 30 wt % hydrogen peroxide solution was mixed with the fine emulsion and vacuum charged into a 500 ml high pressure reactor. The reactor was purged twice with nitrogen and evacuated, after which a 61%/39% (w/w) vinylidene fluoride/hexafluoropropylene (VDF/HFP) mixture was regulated into the reactor at 150 psi. The reaction began after a 4.9 wt % ascorbic acid aqueous solution was pumped into the reactor at 0.125 ml/min using an HPLC pump. A total of 26.3 g VDF/HFP gaseous monomer mixture and 30 ml ascorbic acid solution were fed. The gas feed rate was determined to be 3.2 g/hr. The reaction product was a latex with a mean particle size of 193 nm, and solids measured at 17.1%.

Example 22 was made with surfactant mixture 5, using the same procedure, but with 18 ml ascorbic acid. 16.3 g VDF/HFP gaseous mixture was added at a feed rate of 0.6 g/hr. The pre-emulsion droplet diameter was 220 nm and the mean particle size of the final latex was 251 nm.

These results indicated that fluorinated polyether surfactant mixtures, even cationic in nature, could effectively be used in the polymerization of fluorinated monomers to make fluoropolymers.

Examples 23 and 24

In Examples 23 and 24 fluorochemical polyether surfactant mixtures were evaluated in AFFF formulations.

In example 23, a AFFF concentrate was made containing 2.75% surfactant mixture 8, 2.5% sodiumoctylsulphate, 2.5% Steol, 15% ethyleneglycol monobutylether, 1% ammoniumacetate and 76.25% deionised water. A clear solution was obtained. The concentrate was diluted to a 3% premix with fresh water (i.e., tap water) or with synthetic seawater (composition according to ASTM D1141-52). The surface tension was measured and the results are given in Table 5. 150 ml of each 3% solution was foamed in a kitchen blender for 10 seconds, after which the foam was immediately transferred to a glass flask. The foams passed the film forming test on cyclohexane. Further foam characteristics were evaluated and the results are given in Table 5.

In Example 24, a 3×3 formulation was made by mixing 3.6% surfactant mixture 8, 5% Witcolate, 0.925% Kelzan™ polysaccharide resin, 0.1% Starpol™ starch, 1.5% oligomer MeFBSEMA/DMAEMA-N-oxide 60/40 (prepared according to US 20010001478, example 1, but using MeFBSEMA instead of EtFOSEMA), 8% ethyleneglycol monobutylether, 22.5% ethyleneglycol and 58.375% deionised water. A viscous composition, with Brookfield viscosity of 1.920 cps was obtained. The concentrate was diluted to 3% with fresh water (i.e., tap water) or with synthetic seawater (composition according to ASTMD1141-52) and the surface tension was measured according to the Du Nouy ring method. The results are given in table 5. 150 ml of the 3% solutions were foamed in a kitchen blender for 10 seconds. The foams passed the film forming test on cyclohexane. The foam, prepared with a 3% mixture in fresh water was stable (according to the foam stability test) on acetone for 12 min and 45 sec. Other foam properties were measured as given in Table 5.

TABLE 5 properties of AFFF foams

| Ex | Surface tension (mN/m) Fresh water | Surface tension (mN/m) Sea water | Foam expansion Fresh water | Foam expansion Sea water | $T^{1/4}$ draintime (sec) Fresh water | $T^{1/4}$ draintime (sec) Sea water |
|---|---|---|---|---|---|---|
| 23 | 16.1 | 17.4 | 8.8 | 7.2 | 340 | 300 |
| 24 | 16.5 | 17.8 | 9.0 | 8.4 | 480 | 440 |

The results indicate that fire fighting compositions could be made using the mixtures of fluorinated polyether surfactants, with very good physicochemical properties.

Example 25

In Example 25, the use of a composition comprising fluorochemical polyether surfactant mixtures according to the invention was evaluated in an aqueous treatment composition for hard surfaces. In a 400 ml beaker were mixed 20 g ECC-1000 (fluoropolymer, commercially available from 3M), 10 g of a 50% solution of surfactant mixture 8 in ethanol/water 70/30 and 20 g ethanol. A clear mixture was obtained. 80 g deionised water were added and the mixture was emulsified by ultrasonic action for 3 minutes, using a Branson Digital Sonifier, model 450-D. A slightly milky emulsion was formed. Ethanol was stripped off at 50° C. using aspirator vacuum. 0.5 g of this emulsion was further diluted with 1.5 g acetic acid, 10 g triethyleneglycol monomethylether and 88 g deionised water. Comparative example C-2 was made with a solution of 0.1% ECC-100, 1.5% water, 3% acetic acid and 95.6% ethanol. The mixtures were sprayed onto glazed ceramic tiles (available from Sfinx, Netherlands) having a temperature of 150° C., at a rate of about 20 ml/minute. Excess product was removed at about 90° C. to restore the initial gloss of the tile. After 24 hrs, contact angles with DI water and hexadecane were measured using a TGHM goniometer. The results are given in table 6.

TABLE 6

Repellent properties of ceramic tiles

| | Contact angles (°) | | | |
|---|---|---|---|---|
| | Water | | n-Hexadecane | |
| Ex | Initial | Abrasion | Initial | Abrasion |
| 25 | 105 | 79 | 79 | 48 |
| C-2 | 100 | 85 | 66 | 52 |

The results indicated that the fluorinated polyether surfactant mixtures could be used to prepare aqueous treatment compositions for hard surfaces. The addition of the hydrophilic surfactants did not influence the hydrophobic and oleophobic properties of the treated substrates.

What is claimed is:

1. A composition comprising an organic or aqueous liquid having dissolved or dispersed therein a mixture of fluorinated polyethers of the formula:

$$(R_f)_n—X_w—Z$$

wherein n is 1 or 2, w is 0 or 1, X is a divalent or trivalent organic linking group, Z is a polar group selected from the group consisting of an acid group or salt thereof, an ammonium group, an amine-oxide group and an amphoteric group, and $R_f$ represents a perfluorinated polyether group of the formula:

$$CF_3CF_2CF_2—O—[CF(CF_3)CF_2O]_k—CF(CF_3)—$$

wherein k is at least 1;

said mixture of fluorinated polyethers having a weight average molecular weight between 750 g/mol and 5000 g/mol and the amount of perfluorinated polyether groups in said mixture where k is 2 or less, is not more than 10% by weight of the total amount of perfluorinated polyether groups in said mixture.

2. The composition according to claim 1, wherein the organic liquid is selected from the group consisting of polar solvents selected from the group consisting of alcohols, ketones, esters, ethers and amides, non-polar solvents selected from the group consisting of aromatic and aliphatic hydrocarbon solvents and halogenated solvents selected from the group consisting of hydrofluoroethers, hydrofluorocarbons and chlorinated hydrocarbons.

3. The composition according to claim 1, wherein the organic linking group corresponds to the formula —CONR⁸—(CH₂)ₛ—, wherein R" is hydrogen or $C_{1-6}$-alkyl or $C_{1-6}$-kyl substituted by halogen, OH, or SH and s is 1 to 20.

4. The composition according to claim 1, wherein Z corresponds to the formula:

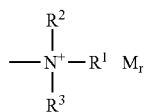

wherein each of $R^1$, $R^2$ and $R^3$ independently represents a hydrogen atom or a hydrocarbon group that may optionally be substituted, M represents a counter ion, r is 0 or 1, and when r is 0, one of $R^1$, $R^2$ and $R^3$ represents a hydrocarbon group that is substituted with an acid group or wherein Z corresponds to the formula:

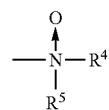

wherein $R^4$ and $R^5$ are independently $C_{1-6}$-alkyl, $C_{1-6}$-alkyl substituted by a halogen, a $C_{1-6}$-alkoxy, $NO_2$ or CN group, or $R^4$ and $R^5$ join to form a 5 to 7 menibered ring that may contain one or more additional hetero atoms and that may be substituted by one or more $C_{1-6}$-alkyl groups.

5. The composition according to claim 1 further comprising one or monomers capable of polymerization.

6. The composition according to claim 1 further comprising a fluorochemical compound capable of providing oil- and/or water repellency properties to a substrate.

7. A mixture of fluorinated polyethers of the formula:

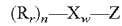

wherein n is 1 or 2, w is 0 or 1, X is a divalent or trivalent organic linking group, Z is a polar group selected from the group consisting of an ammonium group, an amine-oxide group and an amphoteric group, and $R_f$ represents a perfluorinated polyether group of the formula:

wherein k is at least 1;
said mixture of fluorinated polyethers having a weight average molecular weight between 750 g/mol and 5000 g/mol and the amount of perfluorinated polyether groups in said mixture where k is 2 or less, is not more than 10% by weight of the total amount of perfluorinated polyether groups in said mixture.

8. A method of altering the surface energy and/or interfacial free energy of a medium, said method comprising 1) providing a medium and 2) incorporating a fluorinated polyether composition therein, said fluorinated polyether composition comprising a mixture of fluorinated polyethers of the formula:

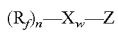

wherein n is 1 or 2, w is 0 or 1, X is a divalent or trivalent organic linking group, Z is a polar group selected from the group consisting of an acid group or a salt thereof, an ammonium group, an amine-oxide group and an amphoteric group, and $R_f$ represents a perfluorinated polyether group of the formula:

wherein k is at least 1;
said mixture of fluorinated polyethers having a weight average molecular weight between 750 g/mol and 5000 g/mol and the amount of perfluorinated polyether groups in said mixture where k is 2 or less, is not more than 10% by weight of the total amount of perfluorinated polyether groups in said mixture.

9. The method of claim 8, wherein the organic linking group corresponds to the formula —CONR⁶—(CH₂)₉—, wherein $R^a$ is hydrogen or $C_{1-6}$-alkyl or $C_{1-6}$-alkyl substituted by halogen, OH, or SH, and s is 1 to 20.

10. The method of claim 8, wherein Z corresponds to the formula:

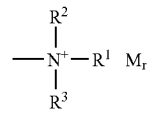

wherein each of $R^1$, $R^2$ and $R^3$ independently represents a hydrogen atom or a hydrocarbon group that may optionally be substituted, M represents a counter ion, r is 0 or 1, and when r is 0, one of $R^1$, $R^2$, and $R^3$ represents a hydrocarbon group that is substituted with an acid group or wherein Z corresponds to the formula:

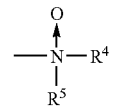

wherein $R^4$ and $R^5$ are independently $C_{1-6}$-alkyl, $C_{1-6}$-alkyl substituted by a halogen, a $C_{1-6}$-alkoxy, $NO_2$, or CN group, or $R^4$ and $R^5$ join to form a 5 to 7 memberod ring that may contain one or more additional hetero atoms and that may be substituted by one or more $C_{1-6}$-alkyl groups.

11. The method of claim 8, wherein said medium is a coating composition or fire-fighting agent.

* * * * *

UNITED STATES PATENT AND TRADEMARK OFFICE
CERTIFICATE OF CORRECTION

PATENT NO. : 7,141,537 B2
APPLICATION NO. : 10/696950
DATED : November 28, 2006
INVENTOR(S) : Frans A. Audenaert It is certified that error appears in the above-identified patent and that said Letters Patent is hereby corrected as shown below:

Page 1
Column 1, line 8, under "U.S. Patent Documents", after "1/1971" delete "Bartlrtt" and insert --Bartlett--, therefor.

Column 1, the following references should be added:
--4687707   08/18/1987   Matsuo et al.
5739369    04/14/1998   Matsumura et al.
5919886    07/16/1999   Matsuda et al.
5922787    07/13/1999   Kondo et al.
6649272    11/18/2003   Moore et al.
2003/0138643  07/24/2003   Moore et al.
PCT WO 99/03941    01/28/1999--

Page 2
Column 2, line 1, under "Other Publications", delete "MIlton" and insert --Milton--, therefor.

Column 3
Line 40, delete "-O(CH$_2$)$_s$and" and insert -- -O(CH$_2$)$_s$- and--, therefor.

Column 6
Line 19, after "typically" delete "an" and insert --a--, therefor.

Column 13
Line 2, delete "Thereof." and insert --Thereof--, therefor.
Line 20, delete "proceduere" and insert --procedure--, therefor.

Column 14
Line 32, delete "NH$_4$ $^{30}$" and insert --NH$_4^+$--, therefor.

Column 15
Line 58, delete "n-octyhnercaptane." and insert --n-octylmercaptane.--, therefor.

Column 17
Line 30, delete "1.920" and insert --1920--, therefor.

UNITED STATES PATENT AND TRADEMARK OFFICE
CERTIFICATE OF CORRECTION

PATENT NO. : 7,141,537 B2
APPLICATION NO. : 10/696950
DATED : November 28, 2006
INVENTOR(S) : Frans A. Audenaert It is certified that error appears in the above-identified patent and that said Letters Patent is hereby corrected as shown below:

Column 19
Line 1, Claim 3, delete "-CONR$^8$" and insert -- -CONR$^a$--, therefor.
Line 1, Claim 3, delete "R$^{th}$" and insert --R$^a$--, therefor.
Line 2, Claim 3, delete "C$_{1-6}$-kyl" and insert --C$_{1-6}$-alkyl--, therefor.
Line 28, Claim 4, delete "R$^3$" and insert --R$^5$--, therefor.
Line 30, Claim 4, delete "menibered" and insert --membered--, therefor.
Line 40, Claim 7, delete "(R$_r$)$_n$" and insert --(R$_f$)$_n$--, therefor.
Line 46, Claim 7, delete "CF$_2$O]$_{k\text{-CF(CF3)-}}$" and insert --CF$_2$O]$_k$-CF(CF$_3$)- --, therefor.

Column 20
Line 13, Claim 8, delete "1 ;" and insert --1;--, therefor.
Line 16, Claim 8, delete "weight" and insert --weight--, therefor.
Line 22, Claim 9, delete "-CONR$^6$-(CH$_2$)$_9$-," and insert -- -CONR$^a$-(CH$_2$)$_s$-,--, therefor.
Line 49, Claim 10, delete "NO$_2$," and insert --NO$_2$--, therefor.
Line 50, Claim 10, delete "memberod" and insert --membered--, therefor.

Signed and Sealed this

Twenty-ninth Day of July, 2008

JON W. DUDAS
*Director of the United States Patent and Trademark Office*